United States Patent
Kanungo

(10) Patent No.: US 10,389,689 B2
(45) Date of Patent: *Aug. 20, 2019

(54) SYSTEMS AND METHODS FOR SECURELY STREAMING MEDIA CONTENT

(71) Applicant: ECHOSTAR TECHNOLOGIES L.L.C., Englewood, CO (US)

(72) Inventor: Rajesh Kanungo, Sunnyvale, CA (US)

(73) Assignee: SLING MEDIA L.L.C., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/170,613

(22) Filed: Jun. 1, 2016

(65) Prior Publication Data

US 2016/0277366 A1 Sep. 22, 2016

Related U.S. Application Data

(63) Continuation of application No. 14/283,952, filed on May 21, 2014, now Pat. No. 9,385,999, which is a (Continued)

(51) Int. Cl.
*G06F 21/00* (2013.01)
*H04L 29/06* (2006.01)
(Continued)

(52) U.S. Cl.
CPC ...... *H04L 63/0435* (2013.01); *H04L 63/0457* (2013.01); *H04L 63/062* (2013.01);
(Continued)

(58) Field of Classification Search
CPC ... H04L 63/0435; H04L 63/062; H04L 63/08; H04L 63/10; H04L 65/4069; H04L 67/42;
(Continued)

(56) References Cited

U.S. PATENT DOCUMENTS 6,065,050 A 5/2000 DeMoney
6,389,218 B2 5/2002 Gordon et al.
(Continued)

FOREIGN PATENT DOCUMENTS

TW I313811 B 8/2009
TW I317597 B 11/2009
WO WO-2012094361 A1 * 7/2012 ......... H04L 63/0428

OTHER PUBLICATIONS

Hao Li, Cheng Yang; "A Scheme of Streaming Media Digital Rights Management in Cloud Conditions"; Dec. 2016; ICCIS '16: Proceedings of the 2016 International Conference on Communication and Information Systems; Publisher: ACM; pp. 65-68 (Year: 2016).*
(Continued)

*Primary Examiner* — Shewaye Gelagay
*Assistant Examiner* — Courtney D Fields
(74) *Attorney, Agent, or Firm* — Lorenz & Kopf LLP

(57) ABSTRACT

Systems and methods securely provide media content from a media server to a media client via a network. The media content is segmented to create multiple media segments that are each identified in a playlist, and at least one of the media segments is encrypted using a cryptographic key. The cryptographic key is also identified in the playlist, and the playlist is provided from the media server to the media client via the network. The various media segments and cryptographic keys may then be requested from and provided by the media server using hypertext transport protocol (HTTP) or similar constructs to allow the media client to receive and decrypt the various segments of the media content.

18 Claims, 3 Drawing Sheets

Figure 1:
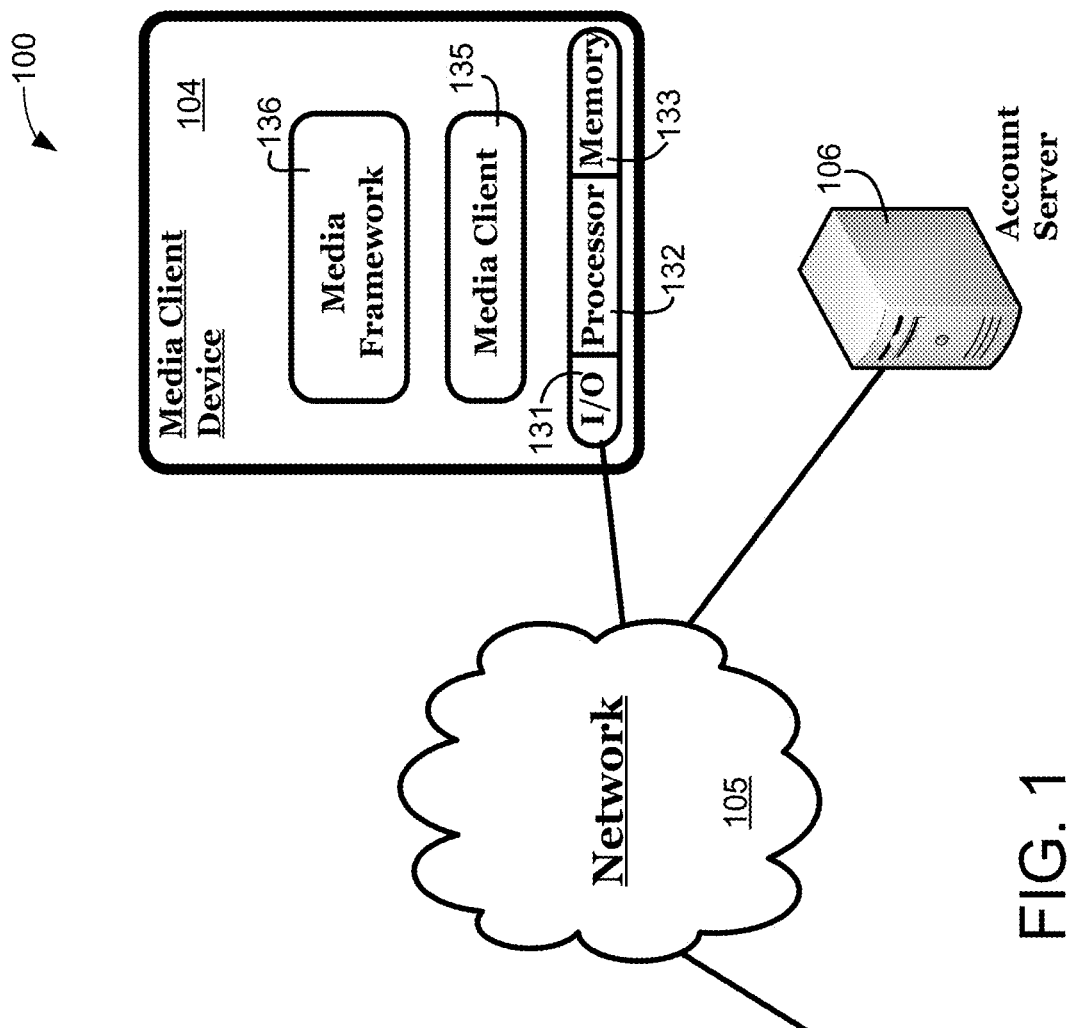

Related U.S. Application Data continuation of application No. 13/053,706, filed on Mar. 22, 2011, now Pat. No. 8,745,388.

(60) Provisional application No. 61/316,377, filed on Mar. 22, 2010.

(51) Int. Cl.

| | | |
|---|---|---|
| *H04N 21/6334* | (2011.01) | |
| *H04N 7/16* | (2011.01) | |
| *H04N 7/167* | (2011.01) | |
| *H04N 7/173* | (2011.01) | |
| *H04N 21/2347* | (2011.01) | |
| *H04N 21/258* | (2011.01) | |
| *H04N 21/262* | (2011.01) | |
| *H04N 21/266* | (2011.01) | |
| *H04N 21/61* | (2011.01) | |
| *H04N 21/845* | (2011.01) | |
| *H04L 29/08* | (2006.01) | |
| H04N 21/254 | (2011.01) | |
| H04N 21/858 | (2011.01) | |

(52) U.S. Cl.
CPC .......... *H04L 63/08* (2013.01); *H04L 63/0823* (2013.01); *H04L 63/10* (2013.01); *H04L 65/4069* (2013.01); *H04L 65/4076* (2013.01); *H04L 65/602* (2013.01); *H04L 67/02* (2013.01); *H04L 67/42* (2013.01); *H04N 7/165* (2013.01); *H04N 7/1675* (2013.01); *H04N 7/17318* (2013.01); *H04N 21/23476* (2013.01); *H04N 21/25816* (2013.01); *H04N 21/26258* (2013.01); *H04N 21/26613* (2013.01); *H04N 21/6125* (2013.01); *H04N 21/63345* (2013.01); *H04N 21/8456* (2013.01)

(58) Field of Classification Search
CPC ... H04L 65/602; H04L 67/02; H04L 63/0823; H04L 63/0457; H04L 65/4076; H04N 7/1675; H04N 7/17318; H04N 21/23476; H04N 21/25816; H04N 21/26258; H04N 21/26613; H04N 21/63345; H04N 7/165; H04N 21/8456

See application file for complete search history.

(56) References Cited

U.S. PATENT DOCUMENTS

| | | | |
|---|---|---|---|
| 7,539,306 B2 | 5/2009 | Ohta et al. | |
| 7,818,444 B2 | 10/2010 | Brueck et al. | |
| 8,160,963 B2* | 4/2012 | Risan | G06F 17/30017 705/51 |
| 8,468,569 B2 | 6/2013 | Osaki et al. | |
| 8,688,991 B1* | 4/2014 | Sunil | H04L 63/06 380/30 |
| 2005/0262257 A1 | 11/2005 | Major et al. | |
| 2007/0031110 A1 | 2/2007 | Rijckaert | |
| 2007/0169161 A1 | 7/2007 | Kienzle et al. | |
| 2008/0222235 A1 | 9/2008 | Hurst et al. | |
| 2009/0043906 A1 | 2/2009 | Hurst et al. | |
| 2009/0047000 A1 | 2/2009 | Walikis et al. | |
| 2009/0182889 A1 | 7/2009 | Hurst et al. | |
| 2010/0005483 A1* | 1/2010 | Rao | H04N 7/17318 725/25 |
| 2010/0169303 A1* | 7/2010 | Biderman | H04N 7/17318 707/723 |
| 2010/0306368 A1* | 12/2010 | Gagliardi | H04L 43/045 709/224 |
| 2011/0035507 A1 | 2/2011 | Brueck et al. | |
| 2011/0138020 A1* | 6/2011 | Pantos | H04N 7/17318 709/219 |
| 2011/0231660 A1 | 9/2011 | Kanungo | |
| 2012/0210216 A1 | 8/2012 | Hurst | |
| 2013/0054972 A1* | 2/2013 | Thorwirth | H04N 21/23439 713/176 |

OTHER PUBLICATIONS

European Patent Office, International searching Authority, "International Search Report" dated Mar. 30, 2011; International Appln. No. PCT/US2011/024807, filed Feb. 14, 2011.
European Patent Office, International Searching Authority, "International Search Report" dated Jul. 7, 2011; International Appln. No. PCT/US2011/029349, filed Mar. 22, 2011.
Fecheyer-Lippens, A. "A Review of HTTP Live Streaming," The ISSUU Digital Publishing Platform, Jan. 25, 2010, pp. 1-37, XP002638990; retrieved from the Internet: URL:http://issuu.com/andruby/docs/http_live_streaming [retrieved on May 24, 2011], pp. 7-18, p. 28, paragraph 1.
Anonymous "HTTP Live Streaming Overview" Blog, Aug. 1, 2009, pp. 1-7, XP002638991; retrieved from the Internet: URL:http://www.lifeandstory.org/about/index.php/categoryblog/49-http-live-streaming [retrieved May 24, 2011] whole document.
Pantos, R. "HTTP Live Streaming, draft-pantos-http-live-streaming-02" Internet Draft of the Internet Engineering Task Force (IETF), Oct. 5, 2009, pp. 1-20, XP015064407, sec. 6.2.5 "Playing encrypted media files" sec. 7.3. Playlist file with encrypted media files.
Samar, Vipin "Single Sign-on Using Cookies for Web Applications" Proc of the IEEE 8th International Workshop on Enabling Technologies: Infrastructure for Collaborative Enterprises (WET ICE '99); Jun. 16-18, 1999; Stanford, CA, USA; Jun. 16, 1999, pp. 158-163, XP010358606, DOI: 10.1109/ENABL.1999,805192; ISBN: 978-0-7695-0365-3, sec. 8: Centralized Login Server Approach.
IBM "Representing Multiple Identities in a Customizable Single Sign-on Token" IP.COM Journal, IP.COM Inc., West Henrietta, NY, US, Jun. 27, 2007, XP013121067, ISSN: 1533-0001, p. 1, paragraph 1.
Takesue, Masaru "An HTTP Extension for Secure Transfer of Confidential Data" IEEE Internatinoal Conference on Networking, Architecture, and Storage 2009 (NAS 2009), Jul. 9, 2009, pp. 101-108, XP031505390, ISBN: 978-0/7695-3741-2, section 1: "Introduction".
Fu, Kevin et al. "Dos and Don'ts of Client Authentication on the Web" Proceedings of the 10th USENIX Security Symposium, Aug. 2001, Washington D.C., Sep. 7, 2001, pp. 1-24, XP002211535, Section 4: "Design" p. 4.
Rescorla, E. "A Survey of Authentication Mechanisms; draft-iab-auth-mech-04.txt" Internet Draft of the Internet Engineering Task Force (IETF), Sep. 1, 2005, pp. 1-41, XP015041477, ISSN: 0000-0004, sec. 9.1.1.1: "The Token Problem"; sec. 9.1.1.3: "Cookies".
Anonymous "A Review of HHTP Live Streaming (Abstract)" The ISSUU Digital Publishing Platform, Jan. 25, 2010, p. 1, XP002638992; retrieved from the Internet: URL:http://issuu.com/andruby/docs/http_live-streaming [retrieved on May 24, 2011] abstract.
Raju, C. Narsimha et al. "Fast and Secure Real-Time Video Encryption" International Institute of Information Technology, Hyderabad, India-500032; 2008.
U.S. Patent and Trademark Office, Non-Final Office Action, dated Nov. 26, 2012 for U.S. Appl. No. 13/053,706.
U.S. Patent and Trademark Office, Non-Final Office Action, dated Jun. 17, 2013 for U.S. Appl. No. 13/053,706.
U.S. Patent and Trademark Office, Notice of Allowance, dated Jan. 31, 2014 for U.S. Appl. No. 13/053,706.
Intellectual Property Office, Office Action and Search Report for ROC (Taiwan) Patent Applicaiton No. 100109764 dated Feb. 25, 2015.

* cited by examiner

SYSTEMS AND METHODS FOR SECURELY STREAMING MEDIA CONTENT

CROSS-REFERENCE TO RELATED APPLICATIONS

This application is a continuation of U.S. Non-Provisional application Ser. No. 14/283,952, filed May 21, 2014; which claims priority to continuation of U.S. Non-Provisional application Ser. No. 13/053,706, filed Mar. 22, 2011; which claims priority to U.S. Provisional Application Ser. No. 61/316,377, filed Mar. 22, 2010, which is incorporated herein by reference.

BACKGROUND

Streaming audio, video and other media content is becoming increasingly prevalent and accessible. Many different network services (e.g., YouTube, Hulu, Sling.com and the like), for example, provide streaming content that can be readily obtained via the Internet or a similar network and that can be played on a conventional computer, mobile phone or other player device. Many consumers also enjoy media content that is "place shifted" from a digital video recorder, set top box or other device to a remotely-located computer, mobile phone or other device. Sling Media Inc. of Foster City, Calif., for example, provides several different hardware and software products that are capable of transmitting or receiving place shifted media content over the Internet or similar networks.

Typically, media streams are transported over the Internet or other networks using any number of different protocols. Examples of protocols used in transporting media streams include Real-time Streaming Protocol (RTSP), Realtime Transport Protocol (RTP) and the Real-time Transport Control Protocol (RTCP), and/or the like. Many other protocols, including many proprietary protocols, are also used.

More recently, media streams are being transported using the well-known hypertext transport protocol (HTTP). HTTP protocols are easily routed on the Internet and similar TCP/IP networks. As a result, many HTTP media streams can be accessed even if firewalls or other access mechanisms would block access using other forms of transport. The Windows Media Server product available from the Microsoft Compotation of Redmond, Wash., for example, supports video streaming using HTTP. The HTTP Live Streaming product available from Apple Computer Inc. of Cupertino, Calif. also provides streaming media to products such as the Apple iPhone, iPod Touch and iPad using HTTP protocols. Other products use HTTP or the like to provide media streams in a similar manner.

Conventional HTTP is readily routed on the Internet or similar TCP/IP networks, so it can readily facilitate convenient access and routing of media streams across many different types of networks. Conventional HTTP media streaming products typically lack the ability to authenticate users before providing access to the media stream, however, or to preserve digital rights management (DRM) or other security constraints related to the media stream.

As a result, it is desirable to create systems, methods and/or devices that are able to securely provide streaming content using HTTP or similar protocols and constructs. These and other desirable features and characteristics will become apparent from the subsequent detailed description and the appended claims, taken in conjunction with the accompanying drawings and this background section.

BRIEF SUMMARY

According to various embodiments, systems and methods are provided to securely provide media content from a media server to a media client via a network. The media content is segmented to create multiple media segments that are each identified in a playlist, and at least one of the media segments is encrypted using a cryptographic key. The cryptographic key is also identified in the playlist, and the playlist is provided from the media server to the media client via the network. The various media segments and cryptographic keys may then be requested from and provided by the media server using hypertext transport protocol (HTTP) or similar constructs to allow the media client to receive and decrypt the various segments of the media content.

According to at least one embodiment, a method to securely provide a stream of media content from a media server to a media client via a network is provided. The method suitably comprises segmenting the media content to thereby create a plurality of media segments that are each identified in a playlist; encrypting at least one of the media segments using a cryptographic key, wherein the cryptographic key is identified in the playlist; providing the playlist from the media server to the media client via the network; and, in response to subsequent requests that are received from the media client via the network, providing the requested media segments and the cryptographic key from the media server via the network to thereby provide the media stream to the media client.

Other embodiments provide a system to securely provide a stream of media content to a media client via a network. The system suitably comprises an interface to the network and a processor. The processor is configured to execute a segmenter module that segments the media content into a plurality of media segments that are each identified in a playlist, an encrypter module that encrypts at least one of the plurality of media segments using at least one cryptographic key that is identified in the playlist, and a server application configured to respond to requests from the media client to thereby provide the playlist, the media segments and the at least one cryptographic key via the network.

Still other embodiments provide a method executable by a media client to securely obtain a stream of media content from a media server via a network. The method suitably comprises receiving a playlist from the media server via the network, wherein the playlist comprises identifiers for each of a plurality of media segments making up the media content and for at least one cryptographic key, wherein at least one of the plurality of segments is encrypted with the at least one cryptographic key; requesting, using the identifiers from the playlist, at least some of the media segments and the at least one cryptographic key from the media server via the network; receiving the requested media segments and the at least one cryptographic key from the media server via the network; decrypting the at least one of the plurality of segments using the cryptographic key; and sequentially providing the plurality of segments, including the at least one decrypted segment, for output.

These examples of various embodiments may be modified or enhanced in any number of ways. A wide variety of alternate and equivalent embodiments are described in increasing detail below.

BRIEF DESCRIPTION OF THE DRAWING FIGURES

Figure 2:
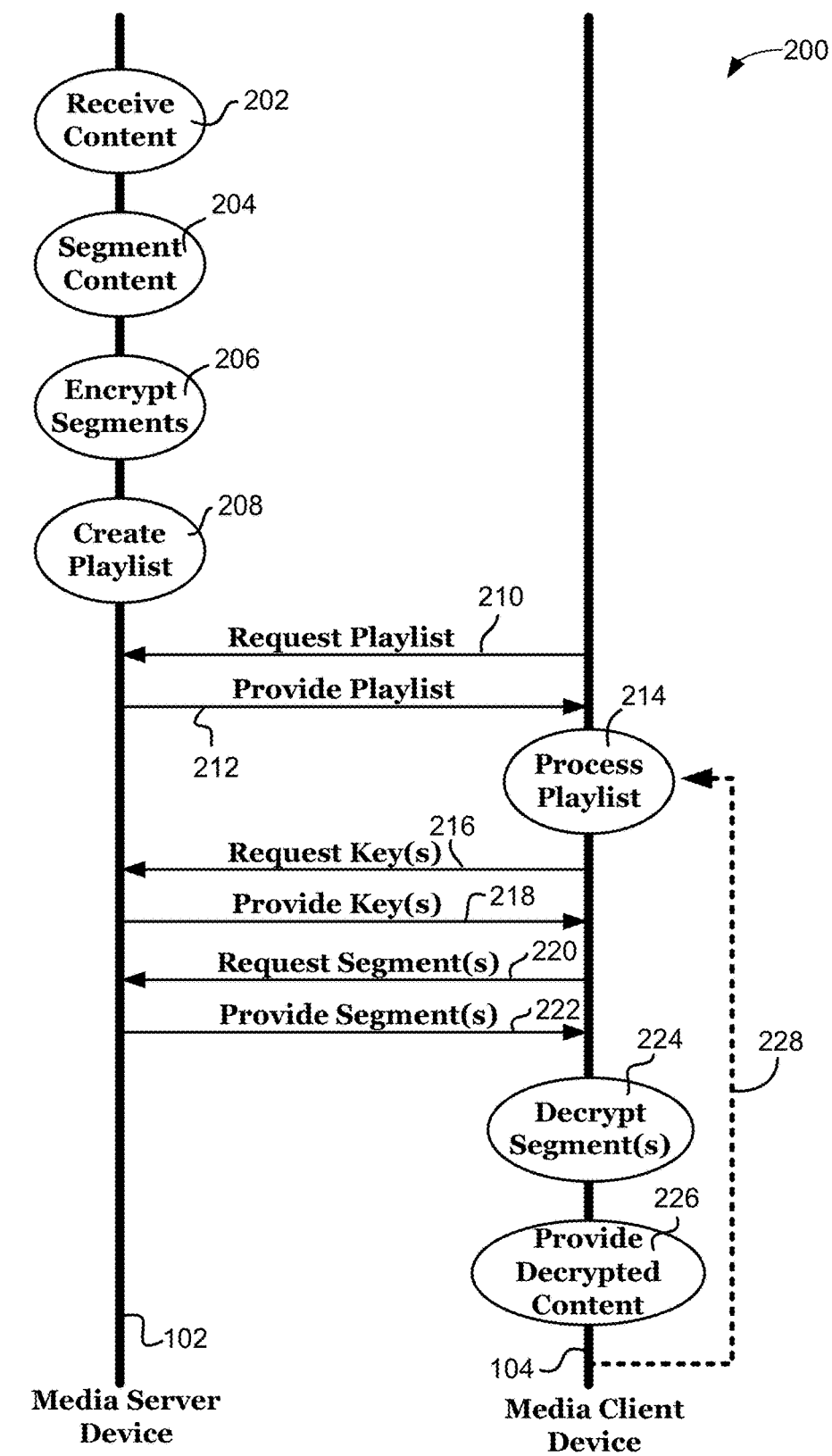
Figure 3:
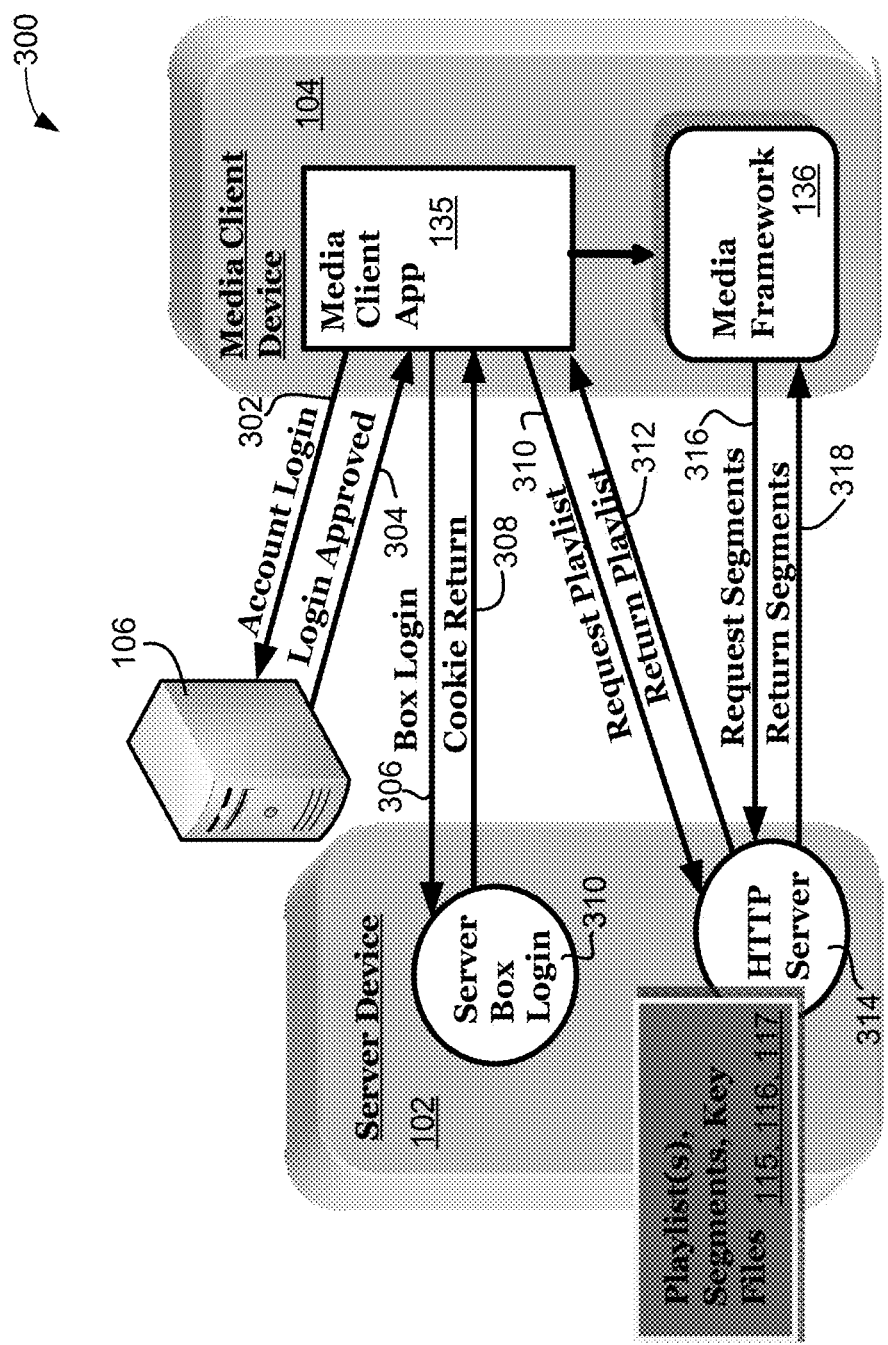

Exemplary embodiments will hereinafter be described in conjunction with the following drawing figures, wherein like numerals denote like elements, and FIG. 1 is a block diagram of an exemplary system for securely streaming media content across a network;

FIG. 2 is a flow diagram of an exemplary process for facilitating secure streaming of media content across a network; and FIG. 3 is a diagram of an exemplary system and process for securely streaming media content across a network to an authenticated user.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various systems and techniques can be used to provide secure media streaming using HTTP or similar file-based protocols. Using the concepts set forth herein, any number of different security levels can be provided to protect content according to license agreements, to prevent unauthorized access, to protect the privacy of user(s), and/or for any other purposes. Multiple security levels may be implemented on a common client or server platform to protect different types of data. For example, some content may be "open access" or otherwise available to all users. Other types of content may demand secure protection in the form of authentication, encryption, content protection and/or the like. Various techniques and systems are set forth below, and in the associated drawing figures.

FIG. 1 shows an exemplary implementation of a system 100 that is capable of securely streaming video content 110 from a server device 102 to a media player device 104 over a network 105 using hypertext transport protocol (HTTP) or other file-based retrieval techniques. Generally speaking, video content 110 is broken into segments 117 represented by files that are each available at a unique uniform resource locator (URL) referenced in a playlist 115. One or more of the segments 117 is encrypted to prevent unauthorized reproduction or use of the segment. The key(s) used to decrypt the encrypted segments 117 are maintained in key files 116 that are provided to client device 104 as needed to decrypt approved segments 117. Key files may be similarly referenced by URLs or other identifiers within the playlist 115 so that the media client 104 can retrieve needed files as appropriate. Various embodiments may supplement or modify these general concepts in any number of different ways. For example, FIG. 1 shows a centralized account server 106 that may be used for user authentication over network 105 in some embodiments (e.g., the embodiment described below with respect to FIG. 3). Authentication may alternately or additionally be performed by media server 102, as appropriate. Other embodiments may provide additional or alternate features, as desired.

As illustrated in FIG. 1, both server device 102 and the media player device 104 are intended as computing systems with conventional microprocessors or other processing circuitry, memory, input/output features (e.g., network interfaces) and the like. To that end, server device 104 is shown with a conventional memory 121, processor 122 and input/output features 123. Client device 104 is similarly shown in FIG. 1 with conventional input/output features 131, as well as processor 132 and memory 133. Input/output features 123 and 131 may include any sort of wireless, wired or other network interfaces to facilitate communication on network 105.

Server device 102 is any computing module, device or other apparatus capable of providing a secure video stream to media client 104 via network 105. In some implementations, server device 102 may be ay sort of media processing device such as any sort of set top box (STB), place shifting device, digital video recorder (DVR) or other device dedicated to processing media content. In other embodiments, server device 102 may be implemented using a conventional general-purpose computer system using appropriate software to execute the various features and functions described herein. Server 106 may be equivalently implemented using a conventional network server and/or any sort of virtual or "cloud" service as desired.

The media player client 104 may be similarly implemented using conventional network client devices such as computer systems, tablet or pad computers, media players, mobile phones, personal digital assistants, portable computing devices, video game players and/or the like.

In various embodiments (such as those based upon Apple Live HTTP protocols provided by Apple Computer Inc. of Cupertino, Calif. or the like), media content 110 that is to be streamed on network 105 is broken up into smaller segments 117 that are each identified using a conventional uniform resource locator (URL) in a playlist 115 or the like that can be shared with media client 104. After receiving playlist 115, client 104 is able to retrieve each segment 117 referenced in the playlist 115 using conventional TCP/IP file retrieval techniques, such as HTTP or the like. A recorded television program or other media file 110 stored on a digital video recorder (DVR), for example, may be converted to a number of segments 117 prior to placeshifting or other streaming to client device 104. The segmentation may be performed by a segmentation routine 112 at the media server 102 that makes the segmented stream available for streaming on a network. Encryption may be similarly performed by any or sort of hardware, firmware and/or software encryption routine 114 executing at media server 102. Software segmentation and encryption routines 112, 114 may reside, for example, in memory 121 and may be executed by processor 122 in such embodiments. Alternately, content 110 may be segmented and/or encrypted by a content provider, by a remotely-located server on network 105 or another network, and/or by any other source.

As noted above, the URLs identifying all of the segments 117 associated with a movie, television program or other media content 110 may be maintained in a playlist 115. In the Apple Live HTTP product, for example, the playlist file 115 is typically formatted as a .M3U8 file, which is an extension of the .M3U format commonly used for mp3 playlists. The .M3U8 format may variously support live streaming using dynamic playlists (e.g., new segments can be added to the playlist during streaming and playback) and/or more static playlists wherein the segments are established prior to streaming or playback. In some implementations, segments 117 are assigned names or URLs that contain randomized (or pseudo-randomized) components to discourage unauthorized access through URL-guessing. Other embodiments may use formats or protocols other than those described herein for file naming, resource location and/or any other purpose.

To receive and play the media stream, then, the media player typically obtains the playlist 115 from the server or another source to obtain the URLs of the various media segments. The playlist file 115 may be obtained, for example, using conventional HTTP "GET" commands, or using FTP, TFTP and/or other file retrieval techniques. The various segments 117 can then be obtained using their URLs in sequence to receive the media stream for playback. In various embodiments, each segment 117 may be requested by media client 104 using conventional HTTP "GET" constructs that include the URLs of the segments 117 described in playlist 115. A media "stream" can therefore be delivered (e.g., using HTTP "PUT" instructions carried out by media server 102) across conventional networks 105 as a series of segments 117 that are requested by the media client 104 based upon the contents of playlist 115 and that are delivered by media server 102 as appropriate.

FIG. 2 shows an exemplary process 200 for delivering a secure media stream from a media server 102 to a media client 104 via a network 105. Content 110 is initially received at media server 102 from a network, broadcast, stored media or other source (function 202). In embodiments wherein media server 102 is an STB, for example, the STB may receive broadcast content from a cable, DBS, terrestrial broadcast or other source. Broadcast content 110 may be streamed "live" on network 105, as desired, or stored in a DVR or similar device for streaming at a later time. Other embodiments may obtain the content 110 from a DVR, STB or other local media source without the need to receive and decode broadcast content.

As described above, streamed content 110 is initially chopped or otherwise segmented (function 204) to create smaller files that can be sequentially served on network 105 using conventional HTTP (or similar) techniques. In the embodiment shown in FIG. 1, content 110 is divided by segmenter 112 to create multiple segments 117 that are each stored as a separate file. Each segment 117 is identified by a filename or other URL that identifies a location of the segment file that can be accessed from network 105. Segmenter 112 and/or other logic executing on media server 102 may also produce a playlist 115 (function 208) that contains URLs or other identifiers associated with each of the various segments 117 making up the stream.

The security of transmission using the HTTP techniques described above may be improved by encrypting some or all of the media segments 117 prior to transmission across network 105. To that end, one or more segments 117 are encrypted as desired to secure the content 110 against unintended or unauthorized use (function 206). In the example of FIG. 1, an encrypter 114 associated with the server device 102 receives and encrypts one or more segments 117 according to any appropriate technique and using any appropriate key(s) 116.

Any encryption techniques may be used, including any sorts of symmetric or asymmetric techniques as desired. Some embodiments may use, for example, conventional advanced encryption standard (AES) cryptography or the like. Such an embodiment may use key lengths of 128 bits or so, although other embodiments may use longer or shorter key lengths as desired.

Any number of segments 117 may be encrypted, and any number of discrete keys may be used, depending upon the level of security that is desired. Some embodiments may encrypt only a subset of the segments 117 in the playlist 115 to conserve computing resources, and encrypted and unencrypted segments may be mixed and matched in any manner. Various embodiments may encrypt only a few segments 117, for example, to reduce processing demand on server 102 and/or client 104 as desired. Other embodiments may encrypt larger portions of the media content 110 and/or use stronger encryption techniques (e.g., longer keys, multiple keys, etc.) to provide stronger security, as warranted and desired. Still other embodiments may randomize (or pseudo-randomize) the encryption such that it becomes difficult to predict the particular segments 117 of any particular program content 110 that are encrypted, thereby further complicating attempts to thwart the encryption. Further, keys may be uniquely assigned to each encrypted segment 117 in some implementations, although other embodiments may use a common key to encrypt all of the segments 117 (or at least multiple segments 117) within the stream. Media content 110 may therefore be protected during HTTP streaming by encrypting some or all of the segments 117 of the content using any number of unique or shared keys, as desired.

In various embodiments, one or more key files 116 are created to describe the authentication keys used, and the playlist 115 is created or augmented (function 208) to make reference (e.g., by URL or other identifier) to the key file(s) 116 used to encrypt each encrypted segment 117. The playlist 115 therefore includes URLs or similar identifiers associated with both segments 117 and keys 116; equivalent embodiments may use separate playlists or other constructs to deliver identifiers for keys and/or segments to media client 104, as desired.

The media client 104 initially requests 210 and receives 212 the playlist 115 from the server 102 or another appropriate source (e.g., a content delivery network (CDN) or the like). Playlist 115 may be obtained using conventional or secure HTTP "GET" and "PUT" constructs, or the like. Some embodiments may use secure HTTP to prevent third parties from observing the contents of the playlist 115 as it is transferred across network 105, as desired. Media client 104 may obtain the URL of the playlist in any manner; various embodiments may provide the URL at a well-known or readily-located address, or the URL may be provided by a central server (e.g., server 106) or by media server 102 during login or other procedures. Other embodiments may locate and transfer playlist 115 using any other techniques.

After retrieving the playlist 115, the media client 104 is able to process the playlist 115 (function 214) to request segments 117 and/or keys 116 as needed. By processing the URLs of the segments 117 that are contained within the playlist 115 the player is able to sequentially request (function 220) and receive (function 222) each of the referenced segments using the HTTP protocol or the like. Segments 117 may be individually requested and retrieved from media server 102 using conventional or secure HTTP "GET" and "PUT" constructs, for example, using the URLs or other identifiers for the particular segments that are contained in the playlist 115.

Cryptographic keys 116 used to decrypt one or more segments 117 may be similarly obtained using the URLs in the playlist 115. To that end, client device 104 is suitably requests (function 216) and receives (function 218) appropriate keys to decrypt any encrypted segments by accessing the key file(s) 116 referenced in the playlist file 115. As noted above, keys may be stored in any number of files. Some embodiments may provide all of the keys 116 used for the entire stream in a single file, for example, whereas other embodiments may provide each key in a separately-requestable file as desired. Still other embodiments may combine or group multiple keys into different files in any other manner. Keys may be transferred securely using any conventional techniques, such as secure HTTP (HTTPS) or the like.

Any encrypted segments may be decrypted using the retrieved keys (function 224), as appropriate. In various embodiments, segments 117 may be decrypted by a media application 135 executing on media client 104. Other implementations may incorporate decryption into the media framework 136 of the media client platform 104, as desired.

After decryption, the various segments 117 may be rendered for playback in any manner (function 226). Function 226 may involve simply presenting the streamed content 110 on a display associated with client device 104. Equivalently, function 226 may involve providing output signals for presentation on an external television, monitor or other display, as desired.

The actions of requesting and obtaining segments 117 and keys 116 may continue in any manner (function 228). In various embodiments, segments 117 and/or keys 116 are sequentially requested by the media client 104 until all of the desired segments 117 have been obtained and decrypted. This allows the entire media content 110 to be provided as a sort of media stream over network 105 using secure file-based transfer mechanisms such as HTTP. Security is maintained through encryption of some or all of the segments 117, as appropriate.

It is not necessary that the segmenting, encrypting and data sharing functions all be provided on common hardware platform. Equivalent embodiments may segment and/or encrypt the media content 110 at a separate physical and/or logical device, and then provide segmented and/or encrypted content to a media device 102 for delivery to media client 104. A broadcast or file sharing service, for example, could provide media content 110 to a set top box or other media device 102 in a format that is already segmented and/or encrypted so that media device can placeshift or otherwise provide the pre-formatted segments to a remotely-located client device 104, as desired. Still other embodiments may provide segmented and/or encrypted segments 117 using a content delivery network (CDN) or the like.

Various embodiments may additionally provide user authentication for even greater security. In the embodiment shown in FIG. 3, the media player device 104 initially queries a separate server 106 for authentication. Such a server 106 may be implemented using, for example, security assertion markup language (SAML) or the like. In such embodiments, the media player device 104 provides an appropriate credential 302 (e.g., a userid/password combination, a biometric factor, or some other credential) that identifies the user to the authentication server 106. If the credential is approved, the authorization server returns a digital credential 304 in the form of a token, cookie or the like that can be presented to the media server 102 prior to receiving content streams. The digital credential 304 may include such information as finder IDS, SAML assertions and/or other authentication information as appropriate.

After receiving the authentication credential 304, the media player device 104 presents the credential to the media server 102 to authenticate with a login or other authentication module 310 executing on media server 102 as appropriate. This communication may take place using conventional or secure HTTP, as desired. In some embodiments, the client device 104 may authenticate directly with server device 102. Server 102 may then query a remote server 106, and/or may process the authentication locally if sufficient data is present on server 102 to perform the authentication function. The authentication module 310 executing at server 102 therefore recognizes the user based upon credentials supplied by a user of client device 104, by a remote authentication server 106, and/or by any other source as appropriate.

After authenticating, the media client 104 can then HTTP "GET" the playlist 115 using a session cookie (or other information obtained in response 308) as a parameter (function 310). The playlist 115 may be provided to the client 104 using SSL/HTTPS to protect information, if desired. The requested playlist URL is then returned to the client device (function 312) using secure or conventional HTTP or the like, as described more fully above. The various segments 117 may then be requested 316, received 318, decrypted and/or otherwise processed as desired based upon the URLs or other identifiers contained in the playlist 115.

In the embodiment shown in FIG. 3, the device's media player application 135 requests the playlist 115, segments 117 and keys 116 from an HTTP server application 314 executing on server device 102. The URLs for the playlist 115, segments 117 and/or keys 116 may use HTTPS, if desired, for added security. The server device 102 suitably returns the requested playlists, segments and keys, as appropriate, for playback or other output by the media player device 104. As noted above, some embodiments may provide media receiving, segmenting, encrypting and network delivery from common device or platform (e.g., a placeshifting device, STB or the like). Other implementations may distribute some or all of the functions described herein across multiple server devices 102, servers 106 and/or other computing devices as desired. The various functions and features shown in FIG. 3 may therefore be enhanced or otherwise modified in any manner.

Some embodiments may alternately or additionally provide authentication through the use of randomization of the URLs used for the playlist file 115 and/or the various segments 117 making up the media stream. To implement this feature, the URLs associated with the playlist 115 and/or segments 117 may be randomly generated by the segmentizer 112 or the like. The client device 104 can access the playlist URL using a lookup mechanism within the server device 102, using a shared secret between the server 102 and client device 104 (e.g., a pseudorandom number generator), and/or the like. Proxy retrieval of the playlist file 115 could also be used in some implementations, if desired.

As noted at the outset, various levels of security may be provided using encryption, authentication and/or other features as desired. In an encrypted access mode, for example, user privacy can be provided using SSL/HTTPS or similar constructs if the server device 102 has an appropriate SSL (or similar) certificate. SSL and HTTPS can be used to access the playlist 115 and referenced keys 116, as well as the URL of the playlist 115. SSL/HTTPS can also be used to protect a cookie, token or other credential 304 generated during initial authentication. In some implementations, a proxy server may be used to access the media server (e.g., at port 443 or the like) if a direct connection from the player device cannot be conveniently established. In such embodiments, it will typically be desirable to maintain the security of the playlist 115 until it reaches the client device 104, as appropriate.

For even more enhanced security, a "content protected access" mode may be provided in some implementations. In such embodiments, a goal of content protected access may be to prevent unauthorized client devices 104 and/or servers 102 from accessing unencrypted streams of content 110. Often, content 110 is protected by requiring the server 102 to authenticate the client 104 and to ensure that the client device 104 is approved to receive the content 110. A device manufacturer, for example, may wish to limit access to certain content or features to certain product models, certain firmware revisions, or the like. Other restrictions may be implemented and enforced as desired.

Content protection of this sort could use the encrypted access techniques described above in combination with other enhancements. In various embodiments, a shrouded secret is installed in the media client 104 to verify that the player is authorized to receive content from the server 102. This secret is typically obscured using public/private key pairs (e.g., an X.509 certificate) or the like. Such a secret could be provided in hardware, firmware or software by a device manufacturer. Alternately, a secret can be installed by a software developer or other party in any suitable manner. In various embodiments, a certificate or other secret can be contained within an application (e.g., application 135) that is encrypted prior to deployment to the user. A child certificate, for example, can be created with information about a user account, device ID, IMEI number and/or the like to uniquely identify the user and/or device as appropriate. This child certificate could be required for client side SSL (or other) authentication, thereby ensuring that the media client device 104 conforms to the content provider's requirements. Child certificates of this sort could also be used for improved rejection of rogue or forged clients. A listing of known improper certificates could be periodically provided to the media server 102, for example, so that the media server 102 can properly reject such certificates when they are presented.

As noted above, some embodiments may verify client devices 104 using SSL and client authentication (or a proxy), as desired. Alternately, SAML or the like may be used to allow proper authentication to the server 102, as well as rejection of unauthorized clients 104 from a central location.

Many of the particular examples set forth herein describe enhancement of HTTP media streaming (e.g., Apple's Live HTTP product) to support secure transfer of media content over a communications network. Many other embodiments, however, could use similar constructs and features in any number of different settings. Equivalent embodiments may, for example, enhance other network streaming techniques (including techniques based upon other HTTP streaming techniques, or protocols other than HTTP) to secure media streams used for any placeshifting or any other purpose. The systems and techniques described herein may be used for other applications as well, such as any sort of secure distribution, sharing and/or other transmission of streaming video, streaming audio, video gaming content, and/or the like to any number of different products. Such products may be used on any sort of digital or other communications network, including the Internet, any sort of wired or wireless LAN or WAN networks, mobile telephone networks, and/or the like.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executed by a media server system to securely provide a stream of media content to a media client via a network, the method comprising:
   segmenting the media content by the media server system to create a plurality of media segments that are each identified in a playlist;
   encrypting, by the media server system, at least one of the media segments using a cryptographic key, wherein the cryptographic key is stored by the media server system and is retrieved by the media client at a unique address that is identified in the playlist, wherein the unique address is an address on the network;
   receiving an authentication credential at the media server system, wherein the authentication credential is generated by account server that is separate from the media server;
   in response to a successful verification of the authentication credential, providing the playlist including the unique address of the at least one cryptographic key from the media server system to the media client via the network;
   in response to a first request from the media client received by the media server system via the network at the unique address of the at least one cryptographic key included in the playlist, delivering the at least one cryptographic key to the media client; and
   in response to subsequent requests that are received by the media server system from the media client via the network at addresses that are different from the unique address of the at least one encryption key, providing the requested media segments from the media server system via the network to provide the media stream to the media client, wherein the media client uses the cryptographic key to decrypt the at least one of the media segments.

2. The method of claim 1 wherein the authentication credential is initially provided from the account server to the media client, and then from the media client to the media server system.

3. The method of claim 1 wherein an authentication is performed between the media client and the account server on the network, wherein the media client receives the authentication credential from the account server in response to a successful authentication with the account server, and wherein the authentication credential is received at the media server system from the media client via the network.

4. The method of claim 1 wherein the playlist is provided in response to a playlist request received via the network from the media client that includes the authentication credential.

5. The method of claim 4 wherein the authentication credential comprises a session cookie and wherein the playlist request is an HTTP GET request.

6. The method of claim 5 wherein the playlist comprises a plurality of URLs each associated with one of the media segments, and wherein the subsequent requests are HTTP GET requests that include the session cookie and that identify the requested media segments according to the URLs in the playlist.

7. The method of claim 6 wherein the HTTP GET requests are secure HTTP requests.

8. The method of claim 7 wherein the unique address of the at least one cryptographic key is a URL associated with the cryptographic key, and wherein the cryptographic key is provided to the media client in response to an HTTP GET request that includes the URL associated with the cryptographic key.

9. The method of claim 1 wherein the encrypting comprises encrypting different media segments with different cryptographic keys, and wherein each of the cryptographic keys is identified in the same playlist.

10. The method of claim 1 wherein the encrypting comprises encrypting only a portion of the media segments.

11. A system to securely provide a stream of media content to a media client via a network, the system comprising:
a hardware interface configured to communicate via the network;
a memory configured to store instructions; and
a processor configured to execute the instructions stored by the memory to segment the media content into a plurality of media segments that are each identified in a playlist, to encrypt at least one of the plurality of media segments using at least one cryptographic key that is stored by the system and that is identified in the playlist by a unique network address, and to respond to requests from the media client that include a valid authentication credential generated by account server to provide the playlist, the media segments and the at least one cryptographic key via the hardware interface to the network, wherein the at least one cryptographic key is provided in response to a subsequent request received from the media client by the system at the unique network address of the at least one cryptographic key that is identified in the playlist so that the at least one cryptographic key is delivered from the system to the media client separately from the playlist, and wherein the processor is further configured to authenticate the media client, and to provide the playlist only if the media client successfully authenticates.

12. The system of claim 11 wherein a plurality of different cryptographic keys used to encrypt a plurality of different media segments are each identified in the same playlist by uniform resource locators (URLs) associated with each different cryptographic key.

13. The system of claim 11 wherein the server application is a hypertext transport protocol (HTTP) server configured to provide the media segments and the at least one cryptographic key in response to HTTP GET requests containing URLs in the playlist.

14. A method executed by a media client to securely obtain a stream of media content from a media server via a network, the method comprising:
initially authenticating with an account server via the network to generate an authentication credential from the account server in response to a successful authentication, wherein the authentication credential is initially received from the account server by the media client;
directing that the authentication credential generated by the account server be provided to the media server, wherein the media server is separate from the account server, wherein the directing comprises the media client providing the authentication credential generated by the account server to the media server via the network;
receiving, in response to the media server successfully authenticating the authentication credential, a playlist from the media server at the media client via the network, wherein the playlist comprises identifiers for each of a plurality of media segments making up the media content and a unique address for at least one cryptographic key that is stored by and available from the media server, wherein at least one of the plurality of segments is encrypted using the at least one cryptographic key;
requesting, by the media client, the at least one cryptographic key from the media server using the unique address received with the playlist;
requesting, using the identifiers from the playlist, at least some of the media segments from the media server via the network;
receiving the requested media segments and the at least one cryptographic key from the media server via the network;
decrypting the at least one of the plurality of segments using the cryptographic key retrieved by the media client from the unique address in the playlist; and
sequentially providing the plurality of segments, including the at least one decrypted segment, for output.

15. The method of claim 14 wherein the authenticating and directing are performed by a media client application executing on the media client.

16. The method of claim 15 wherein the decrypting of media segments received from the media server is performed by the media client application.

17. The method of claim 16 wherein decrypted segments received from the media client application are sequentially provided to a media framework present on the media client that is separate from the media client application for output to the viewer.

18. The method of claim 1 wherein the encrypting is performed after the media server system receives the authentication credential so that the at least one encryption key is created by the media server system to be unique to the authenticated media client application.

* * * * *